(12) United States Patent
Falcone et al.

(10) Patent No.: US 7,698,182 B2
(45) Date of Patent: Apr. 13, 2010

(54) OPTIMIZING PROFITABILITY IN BUSINESS TRANSACTIONS

(75) Inventors: Richard Falcone, Addison, TX (US);
Keith S. Kelson, Dallas, TX (US);
Jeremy W. Duke, Ft. Worth, TX (US);
Lee R. Johnson, Plano, TX (US);
Robert E. Sullivan, Plano, TX (US);
Randy W. Hoffman, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 1727 days.

(21) Appl. No.: 10/135,883

(22) Filed: Apr. 29, 2002

(65) Prior Publication Data

US 2002/0194096 A1    Dec. 19, 2002

(51) Int. Cl.
*G06Q 40/00* (2006.01)
(52) U.S. Cl. .......................................... 705/35; 114/21
(58) Field of Classification Search .................. 705/14, 705/26, 35; 379/114
See application file for complete search history.

(56) References Cited

U.S. PATENT DOCUMENTS

| | | | |
|---|---|---|---|
| 5,185,781 A | 2/1993 | Dowden et al. | |
| 5,210,789 A | 5/1993 | Jeffus et al. | |
| 5,517,555 A | 5/1996 | Amadon et al. | |
| 5,627,887 A | 5/1997 | Freedman | |
| 5,655,013 A | 8/1997 | Gainsboro | |
| 5,832,068 A | 11/1998 | Smith | |
| 6,078,892 A | 6/2000 | Anderson et al. | |
| 6,330,546 B1 | 12/2001 | Gopinathan et al. | |
| 6,516,056 B1 * | 2/2003 | Justice et al. | 379/145 |
| 6,636,591 B1 | 10/2003 | Swope et al. | |
| 6,639,978 B2 | 10/2003 | Draizin et al. | |
| 6,658,393 B1 | 12/2003 | Basch et al. | |
| 6,947,532 B1 * | 9/2005 | Marchand et al. | 379/114.14 |
| 2002/0184103 A1 | 12/2002 | Shah et al. | |
| 2002/0194113 A1 * | 12/2002 | Lof et al. | 705/37 |
| 2003/0002639 A1 | 1/2003 | Huie | |
| 2003/0046208 A1 | 3/2003 | Lubking et al. | |
| 2004/0078328 A1 | 4/2004 | Talbert et al. | |

OTHER PUBLICATIONS

Groenfeldt, Tom (CFO: The Magazine for Senior Financial Executives v11 n10 pp. 97-99, Oct. 1995).*
U.S. Appl. No. 09/640,831.
U.S. Appl. No. 10/135,878, filed Apr. 29, 2002, Viola et al.

* cited by examiner

*Primary Examiner*—Ojo O. Oyebisi
(74) *Attorney, Agent, or Firm*—Fogarty, L.L.C.

(57) ABSTRACT

A system and method for optimizing profitability is provided disclosing an intelligent customer scoring system (iCSS) for receiving a telephone number and transaction request. When the iCSS receives an initial transaction request, it accesses local information related to the number to predict a real-time initial customer score, wherein the requested initial transaction is allowed in real-time based on a comparison of the initial customer score, an expected profitability of the transaction, and a predetermined threshold level. The iCSS accesses information related to the number and the profitability of the transactions to refine the customer score. When the iCSS receives a subsequent transaction request, it is allowed or denied by comparing the refined customer score and expected profitability with the predetermined threshold. The system further comprises an intelligent revenue opportunity module (iROM) for implementing a plurality of revenue opportunity applications (ROA) responsive to the customer score and other specific transaction requirements.

43 Claims, 4 Drawing Sheets

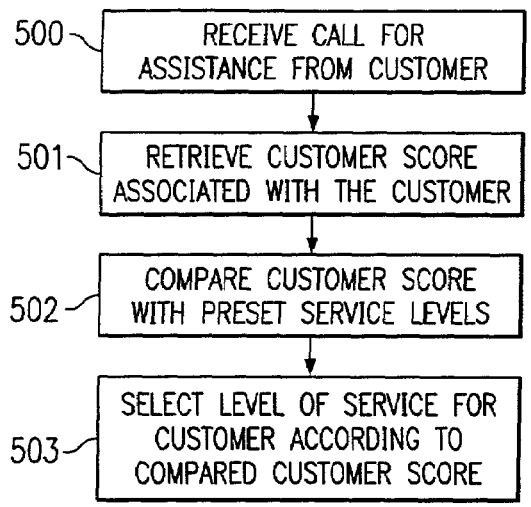
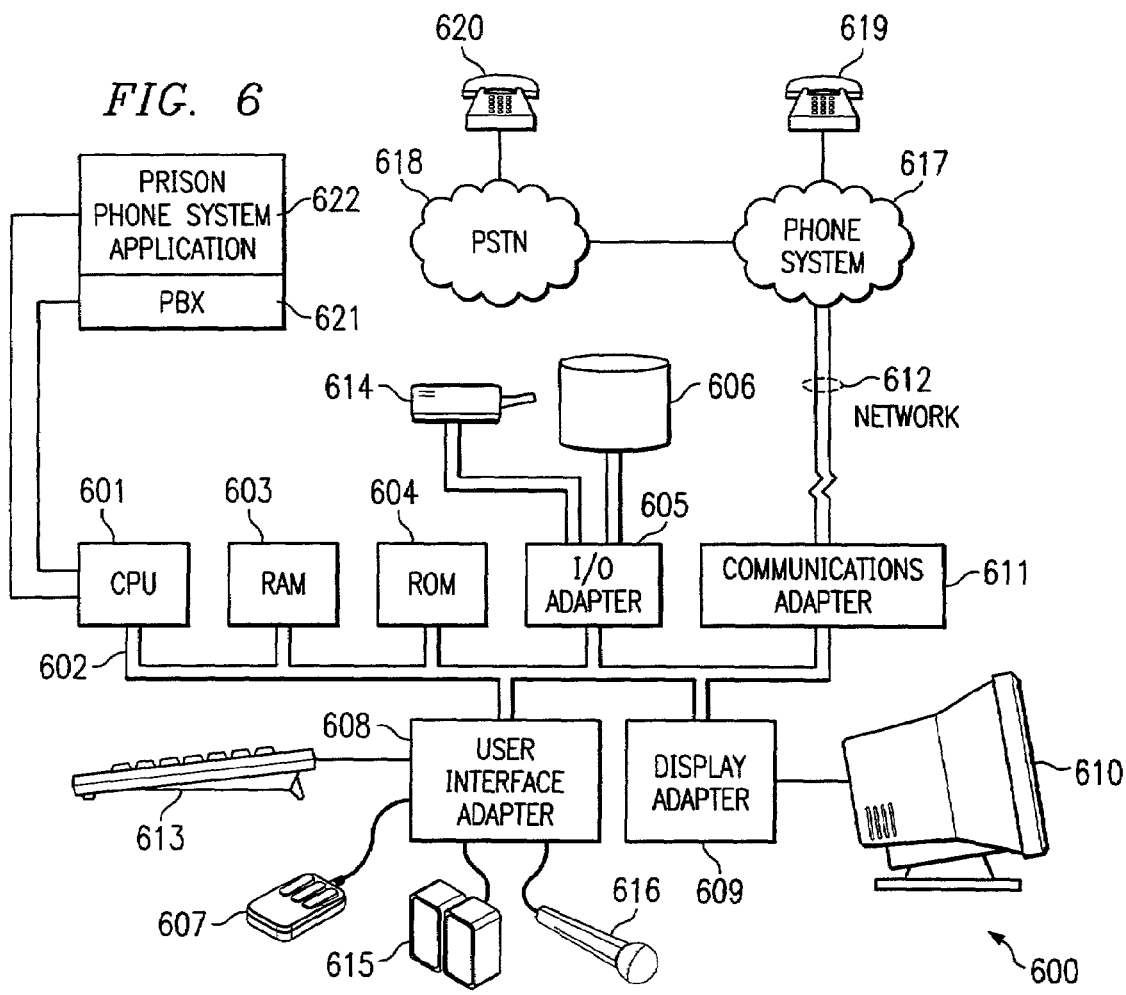

OPTIMIZING PROFITABILITY IN BUSINESS TRANSACTIONS

RELATED APPLICATION

The present invention is related to co-pending and commonly assigned United States patent application entitled "SYSTEM AND METHOD FOR REVERSE BILLING OF A TELEPHONE CALL," and to co-pending and commonly assigned United States patent application serial number entitled "INFORMATION MANAGEMENT SYSTEM AND METHOD," concurrently filed herewith, the disclosures of each of which are hereby incorporated by reference in their entirety

TECHNICAL FIELD

The present invention relates generally to information systems, and more particularly, to a system and method for optimizing profitability in business systems utilizing authorization services.

BACKGROUND OF THE INVENTION

The generation of revenue and profitability is the driving force behind most business models. To supplement the cash purchasing methods in today's credit-based society, most businesses depend on some form of credit or entitlement authorization mechanism allowing for customers to purchase products, services, or other such items without the immediate physical exchange of cash. Inherent in such business models is the reality that a percentage of parties who purchase on credit or entitlement authorizations may eventually not pay, thus, diminishing the business' overall profitability.

In order to balance the risk of such losses against the benefits of maintaining credit entitlement systems, businesses go to great lengths to pre-screen credit applicants with lengthy applications requiring a wealth of personal information. This process is often-times slow and many consumers may decide to take their business to a competitor rather than wait for the completion of the credit application process. Such verification methods maximize risk prevention, but are incompatible with situations that require more immediate determinations.

One example of a business that requires more immediate credit/authorization determinations is the telecommunication provider industry, and, more particularly, businesses that provide telecommunication services to controlled-environment facilities, such as prisons. Prisoners are generally given some form of access to telephones, but the calls must be paid for. Prisons typically do not allow inmates to receive calls, thus, most incoming calls that are not directed to prison administration numbers are blocked. Moreover, prisoners, in general, do not have ready access to cash; therefore, calls are typically made collect.

As with other credit/authorization systems, some of the collect calls may never be paid for by the called parties. In such circumstances, the telecommunication service provider fails to recover the costs of providing the call, which, in turn, causes a loss of profitability. Bad debt losses may sometimes reach into the tens of millions of dollars for each telecommunication service provider with the industry total well over $1 Billion. To address the risk of loss on some of the attempted correctional facility calls, telecommunication service providers sometimes obtain information on the called parties in order to establish a customer database for providing call verification/authorization. When an inmate attempts to make a collect call, the call or transaction request goes through a validation process. The telecommunication service provider accesses its customer databases and may be able to determine (1) can this call be billed (i.e., is there a billing arrangement with the local exchange carrier (LEC) or the called party), (2) if the destination number is already in the service provider's files, has the allotted credit limit been reached, and (3) has there been any information received from the LEC indicating that the called party has not been paying its bills. Depending on the extensiveness of the service provider's internal resources, the service provider may not be able to determine all three of these validation criteria. If favorable information is retrieved for each of the available validation criteria, the call is completed.

Conversely, if the inmate attempts to call a destination number that is not already on the customer database, or negative information is retrieved from the validation process, the service provider typically blocks the call from being completed. While these blocked calls save the telecommunication provider from losses for unpaid calls, some of those dropped calls represent lost potential revenue and profit that the provider would have generated.

Additional considerations that effect the revenue stream of telecommunication providers for prisons arise in the billing and collection (B&C) process. In providing collect calls, the service provider typically sends the collect call bill to the LEC that services the called number. LECs, such as Southwestern Bell, Verizon, BellSouth, Ameritech, and the like generally maintain accurate billing, name, and address (BNA) information, and may be authorized to bill third-party-provided telecommunication services if billing arrangements exists. It should be noted that for purposes of this disclosure, LEC is intended to include not only local exchange carriers, but also competitive LECs (CLECs), inter-exchange carriers (IXCs), and the like. LECs typically bill on a thirty-day billing cycle (i.e., provide a post-pay system that bills each customer for the telephone activity that occurred over the last thirty days). As with every other credit transaction, some LEC customers may fail to pay their bills. When this happens, the LECs recover any costs for providing the prisoner's call directly from the prison telecommunication service provider. Thus, the service provider carry all of the losses, which generally effects profit realization.

Moreover, because of the LECs' typical thirty-day billing cycle, the prison telecommunication provider may not become aware that the bill has become delinquent for a minimum of 120 days after the bill was originally sent to the LEC (LECs may not declare a particular bill uncollectable for 120 days or more in many circumstances). Thus, the service provider would not know to block further calls to that destination number for anywhere from four months to over a year. If calls continue to the delinquent destination number during that period, a substantial amount of revenue and profits would simply be lost.

A separate billing-related issue arises with LECs that do not have billing arrangements with the prison telecommunication service providers. If no billing arrangement exists with the LEC, the service provider must resort to billing the called party directly. In many circumstances, the service provider will not have accurate BNA information on the called party. The service provider may have to purchase this information from the LEC. Additional costs may then be expended generating the direct bill. Therefore, the costs of this "random" direct billing may exceed the actual value recovered in some cases, which decreases profits even further. In response, many of the current systems simply choose to block all calls to destination numbers serviced by non-contracting LECs in order to alleviate this problem. Thus, as with the calls blocked due to a failure to achieve immediate positive validation, the calls blocked due to non-existent billing arrangements with certain LECs may save some lost revenue and profits, but still represent potential lost profits at the point of demand for good paying customers.

Therefore, even though the business model of the prison telecommunications provider is centered on generating profits and recovering revenue, the service provider must account for the potential profit losses from (1) calls to destination numbers that are not blocked but which are ultimately not paid for; (2) continued calls to the same destination number that are allowed before the service provider becomes aware of delinquencies; (3) calls to destination numbers that may represent good credit risks and profit margins but which do not pass the initial validation process; (4) calls to destination numbers that represent good credit risks and profit margins that are nonetheless blocked because the destination number is serviced by LECs without billing agreements with the service provider. In addition to these different means for the service provider to lose revenue and eventually profits, service providers often contract with the prison or other such control-environment facility to pay the prison a commission on the value of each call provided for the privilege of providing the service to the prison. Because the commission typically is taken from the value of the call rather than the amount collected for the call, the commission will generally have to be paid regardless of whether the service provider actually ever collects the cost of the call. Many other different opportunities for revenue loss, such as governmental regulations, contractual commitments, and the like, also must be accounted for by these prison telecommunications providers.

BRIEF SUMMARY OF THE INVENTION

The present invention is directed to a system and method for optimizing profitability in businesses which use credit/authorization transaction models or that segment customers according to differing customer assessments. One embodiment of the present invention comprises an intelligent customer scoring system (iCSS) for receiving a telephone number along with a transaction request, wherein the telephone number represents the identification of the party ultimately responsible for products or services incurred. When the iCSS receives an initial transaction request, it accesses local information related to the telephone number and the potential profitability of the requested transaction to predict a customer score, wherein the requested transaction is authorized or rejected in real-time based on a comparison of the customer score and a predetermined risk threshold level. After processing the initial transaction request, the iCSS accesses additional information related to the telephone number to refine the customer score for a more accurate predictive risk assessment. Therefore, when the iCSS receives a subsequent transaction request, the subsequent transaction is processed responsive to a comparison of the refined customer score with the predetermined risk threshold level. The described embodiment further comprises an intelligent revenue opportunity module (iROM) for implementing a plurality of revenue opportunity applications (ROA) responsive to the customer score.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 5 is a flowchart illustrating steps that may be used to implement the intelligent high-value customer system used in the embodiment of the present invention shown in FIGS. 1 and 2; and FIG. 6 depicts a block diagram of a computer system which is adapted to use the present invention.

DETAILED DESCRIPTION OF THE INVENTION

Figure 1:
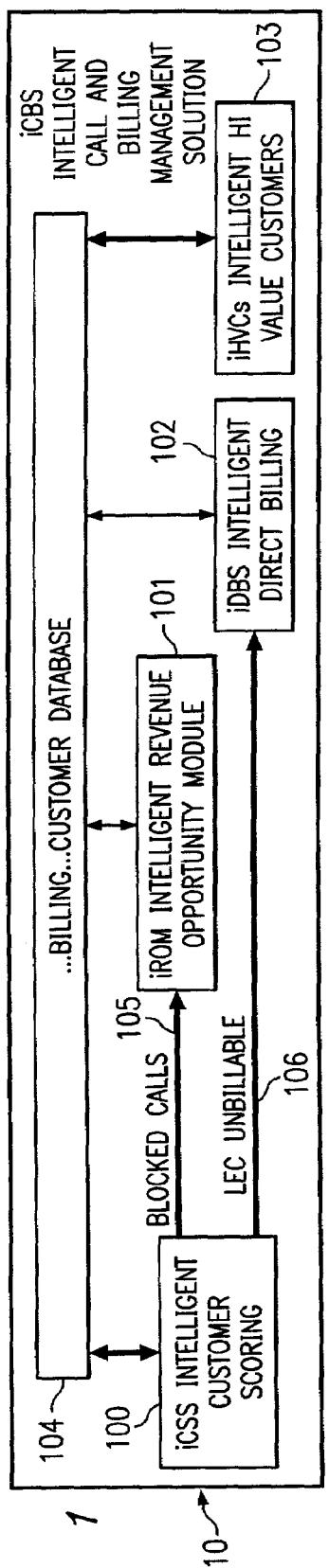
FIG. 1 is a high-level block diagram illustrating the main elements of one embodiment of the present invention.

The present disclosure relates to information systems, and more particularly, to a system and method for optimizing profitability in business transactions. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Turning now to FIG. 1, intelligent call and billing management solution (iCBS) 10 comprises a multi-application system for optimizing and maximizing profitability of business transactions. ICBS 10 includes intelligent customer scoring system (iCSS) 100 for establishing a customer score, and intelligent revenue opportunity module (iROM) 101 for processing the customer score received from iCSS 100 to produce a recommended revenue opportunity application. The purpose behind the calculation of a customer score may vary from application to application. In some embodiments of the present invention, a customer score may represent a predicted risk management score used to authorize or deny requested transactions. In other embodiments, a customer score may represent a profitability value of that customer. ICBS 10 also includes intelligent direct billing system (iDBS) 102, associated with iROM 101, for selecting any one of a number of direct billing products for a customer responsive to customer score-based determinations made within iROM 101. In order to facilitate the calculations and predictive risk assessments made by iCSS 100, iCBS 10 also includes billing and customer database (BCD) 104. BCD 104 is generated as iCBS 10 continues interactions and completing transactions for customers of the business models. As more information is gathered with regard to the customer, it is stored in BCD 104 for future use and evaluation of the customer scores. BCD 104 is "local" to the prison telecommunication service provider, but may be physically located at the same facilities, different facilities, in a local area network (LAN), a wide area network (WAN), or other such network under the control or influence of the service provider.

It should be noted that in additional embodiments of the present invention, iCBS 10 may also incorporate intelligent high value customer service (iHVC) 103 for providing a variable and selective customer service options in which the selection of the level of service offered to a customer is made responsive to the customer score.

While the inventive elements of iCBS 10 are intended to be applicable to a wide variety of business models and business situations, the detailed description presented below of one embodiment of iCBS 10 will be specifically tailored to the example of a prison telecommunications service provider. Considering the specific example, as prisoners attempt to make out-going calls from the prison, the called phone number is received at iCBS 10 and processed by iCSS 100 for calculation of the customer score. The called number may be obtained in many different known ways, such as via dual tone, multiple frequency (DTMF) readers, via an Internet protocol (IP) network, via the signaling system 7 (SS7) network, or via dialed number identification service (DNIS) signals provided by the network.

If a particular called number is not already in the service provider's customer database, the customer score that is preferably calculated by iCSS 100 will be an initial score based on the immediately available local information associated with the requested call and the called number. The telecommunication service provider compares the initial customer score against a preset risk threshold to determine which calls will be allowed and which calls will be blocked. If a call is blocked, a message may preferably be played to the inmate informing him or her of the reason why the call was blocked, or switching the inmate to an operator or interactive voice response (IVR) unit to make arrangements for the requested or future calls. An outgoing call may also preferably be placed by the IVR system to the blocked called party. The outgoing call preferably informs the called party that an inmate was attempting to reach the called party but was blocked, and offers the called party alternative products for arranging future calls from the inmate. The called party may also preferably be asked for additional or supplemental detailed information that may be used for refining the customer score. For example, the called party may be asked for their social security number, the length of time at their home/job, whether they rent or own, and the like. All of this information is preferably stored in BCD 104 for future use. For security purposes, the outgoing call may also preferably offer the called party an option to permanently block the called party's number from being called. Such circumstances may be necessary to thwart harassment of victims by the inmates.

In the prior art systems, the calls that were blocked are completely lost. However, in the described embodiment of the present invention, iROM 101 may preferably determine the profit opportunities that may exist in the blocked calls. ICBS 10 preferably communicates the called numbers of blocked calls 105 to iROM 101 for rating the related customer scores. An opportunity risk matrix (ORM) is established by the service provider identifying various service or billing plans aimed at optimizing profit opportunities for some of the blocked calls. The different risk levels found within the ORM may be lower than the threshold risk level associated with the real-time call authorization procedure. However, the varying levels are selected to correspond to the various customer scores (e.g., a higher risk customer score may be paired with a low-risk billing and collection method, while a low risk customer score may be associated with a higher risk billing and collection plan). As iROM 101 processes the customer score in comparison to the ORM levels through a software or hardware product or application comparator, a subset of possible revenue opportunity applications is identified as potentially available to the customers according to their respective customer scores. These possible revenue opportunity applications may either be presented to the customer for selection during one of the outbound calls made from the IVR system, or may be selected and implemented by the service provider directly.

In addition to blocked calls 105, that are blocked based on an initial validation failure, other blocked calls may exist which are blocked for different reasons. For example, in billing situations, if the prison telecommunications service provider does not have a billing arrangement with a LEC, then the service provider generally cannot bill the LEC for any of the calls that were made to destination numbers serviced by that particular LEC. As noted previously, many of the prior art systems simply block all calls that were made to destination numbers serviced by those non-contracting LECs. In contrast, the described embodiment of the present invention will preferably communicate LEC unbillable calls 106 to iROM 10 for determining whether a direct billing method would be desirable and/or possible for increasing the potential profits from those previously blocked or lost LEC unbillable calls 106. Other blocked calls are also communicated to iROM 101 for determining whether a revenue opportunity application or product would be desirable for potentially increasing profits and revenue recovery on similar blocked calls.

In making this determination of possible revenue opportunity applications and products, parameters such as customer score or risk metric, the general length of the inmate's incarceration (which may preferably be obtained through deduction based on the prison unit from which the call originates, which, itself, may be deduced from the area code and prefix of the calling number, typically obtained from the automatic number identification (ANI) service), the potential profit margin available for the type of calls predicted (e.g., long distance vs. local or comparing average call costs vs. recovery margins for different geographic regions or comparing the available billable rates), the payment history of a particular customer or owner of the destination number, contractual obligations, commission agreements, governmental regulations, the type of transaction requested, costs for external validation, billing and collection (B&C) costs, rate revenue per call, the cost of the different billing products versus their economic benefits, and the like are considered. By weighing those and other parameters in the iT brain or system processor, iROM 101 preferably selects a variety of different payment products, which may include products such as standard post-paid products or prepaid products. They may also preferably determine a billing cycle, such as every 30 days, every two weeks, or even every few days depending on the customer score. They may also preferably determine the appropriate payment cycle, such as 30 days, two weeks, or a couple of days from receiving the bill. IROM 101 also preferably determines whether a direct billing product is necessary and/or desirable, or whether LEC billing product is acceptable. For LEC unbillable calls 106, a direct billing system would be desirable as the prison telecommunication service provider is not capable of billing that particular LEC without a billing arrangement.

For example, when calls are blocked, iCBS 10 may preferably make an automated call to the intended destination number to inform the called party that the inmate's attempted collect call was blocked. The system may then provides the called party several options that may allow the inmate's future calls to that number to be completed. However, instead of calling all of the blocked calls, the system preferably evaluates the customer score of the destination number, as well as the additional information described above, to selectively determine which of the blocked called parties represent attractive profit opportunities. Therefore, instead of losing all of the revenue that could be made from the blocked calls, the described embodiment of the present invention preferably optimizes the potential recovery of revenue and ultimate profitability.

As part of the general management functions performed by the inventive system, the transaction authorizations may take the form of a credit-type authorization, in which the customer would be limited to a certain monetary value of credit, or an entitlement-type authorization, in which the customer would be limited to a numerical, per-use entitlement. In administering either type of usage authorization system, the present invention intelligently sets the usage limit based on individual customer segmentation using the customer score and the additional information considered by iCBS 10 to manage the risk of the transaction.

In the current embodiment described in the context of a prison telecommunication service provider, the authorization would typically be a predictive risk management system. Therefore, depending on the customer score of a particular called party, the inmate would be capable of making calls to that called party up to an individually tailored limit on a transaction-by-transaction basis. For example, considering an initial customer score, because it represents a first transaction request for that called number, the system may set a lower usage limit for the allowed costs of the single call. If, during the course of the call, the usage limit is reached, the called party may either be disconnected, or provided a message and options for paying to extend the call. Similarly, considering a refined customer score, depending on the actual score, a called party could have a usage limit of anywhere from $20.00 to $800, depending on the level of investment the service provider is willing to accept or make in the customer. Furthermore, as a customer continues to build a balance closer to the determined usage limit, iCSS 100 will increase the risk level reflected in the customer or profitability score to reflect the increased investment.

Figure 2:
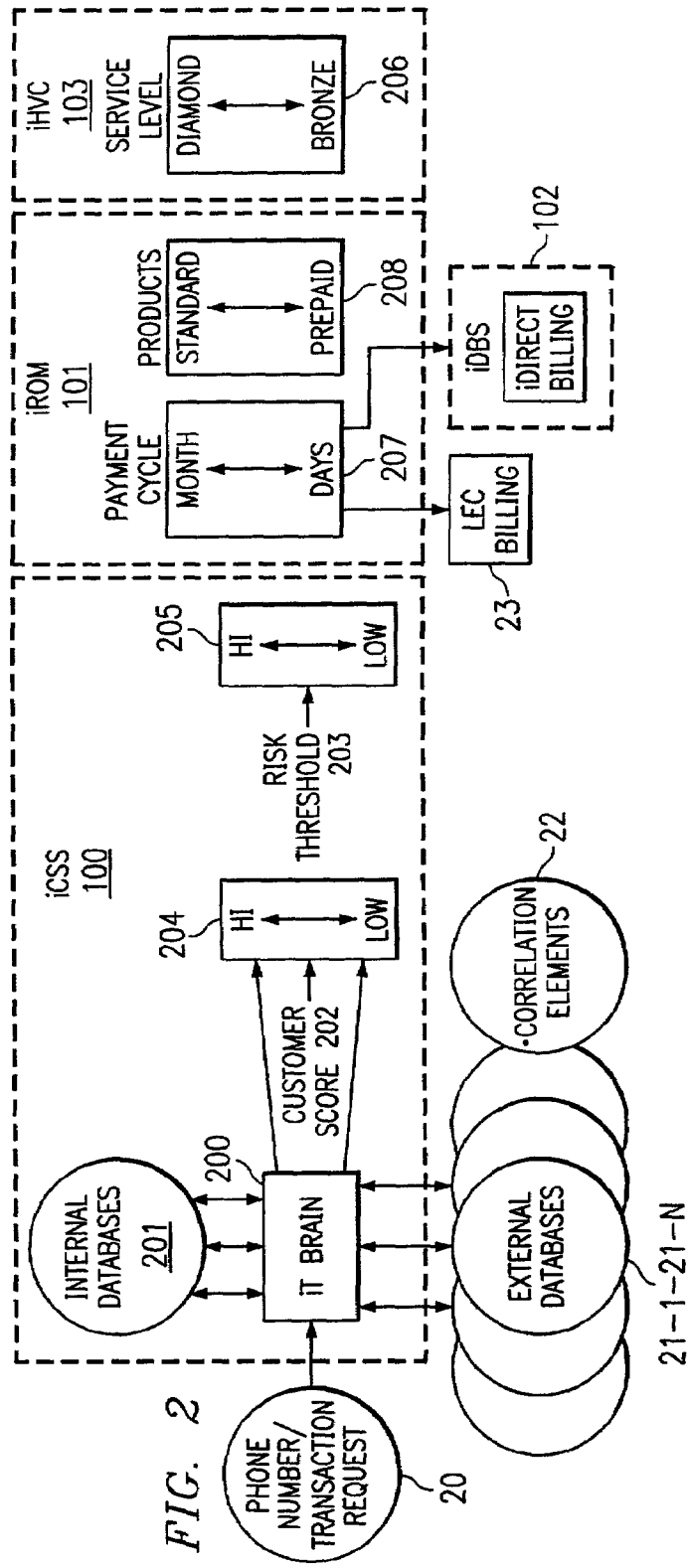
FIG. 2 is a high-level block diagram illustrating a more detailed view of the main elements of the embodiment shown in FIG. 1.

Turning now to FIG. 2, FIG. 2 is a high-level block diagram depicting a more detailed view of some of the elements of iCBS 10, as shown in FIG. 1. In an example operation of the described embodiment of the present invention as applied to a prison telecommunications provider, the elements of FIG. 2 illustrate the system configured to implement and execute the described embodiment. In operation, an inmate enters phone number/transaction request 20 into a prison phone, which requests the transaction of a collect call. Phone number/transaction request 20 is received by iCSS 100 and processed at intelligent targeting (iT) brain 200 to preferably determine a predictive risk level associated with phone number/transaction request 20.

Assuming, for purposes of this example, that phone number/transaction request 20 is the first transaction request for this particular called number, iT brain 200 preferably makes a real-time determination to authorize or block the requested call. To make the real-time authorization, iT brain 200 preferably accesses internal database 201 to find generic demographic information related to phone number/transaction request 20. By using generic and widely available demographic information, as correlated to phone number/transaction request 20, iT brain 200 preferably calculates the initial customer score for purposes of authorizing or blocking the initial collect call request. In additional embodiments, iT brain 200 may also initially access the local information which may provide accurate BNA information, the general length of the inmate's incarceration, the potential profit margin available for the type of calls requested, the payment history of a particular customer or owner of the destination number, contractual obligations, commission agreements, governmental regulations, the type of transaction requested, costs for external validation, B&C costs, rate revenue per call, rate of consumption, and the like. IT brain 200 may preferably cross-reference census data that has been associated with area codes and telephone number prefixes, by using the Bellcore/Telecordia area code system, the NPA/Nxx numbering system. The related census data may preferably be stored locally and used by iT brain 200 to find generalized income levels of persons residing in that geographic area, average home values of persons residing in that area, and, therefore, facilitate calculating an intelligent real-time customer score based solely on the use of the NPA/Nxx data.

After making its real-time determination based on the information gathered from internal database 201, iT brain 200 preferably assigns customer score 202 to phone number/transaction request 20. Customer score 202 will typically reside within preset risk range 204. Depending on the system used by prison telecommunication provider, a high score may correlate to a low risk, high profitability transaction request, whereas a low score would represent a high risk, low profitability transaction request. It should be noted that other scoring systems with different representations of risk levels may also be used in preset risk range 204. Customer score 202 is then compared by iT brain 200 with risk threshold 203. Risk threshold 203 may also preferably be pre-selected by the prison telecommunication service provider on a sliding scale represented by threshold range 205. If the risk level associated with customer score 202 represents a better risk than risk threshold 203, iCSS 100 allows phone number/transaction requests 20 to be completed. However, if customer score 202 represents a higher risk value than risk threshold 203, phone number/transaction request 20 is denied or blocked.

After iT brain 200 makes the determination of whether to block or connect phone number/transaction request 20, it begins to refine customer score 202 by accessing external databases 21-1 through 21-N. The process of accessing external databases 21-1 through 21-N is sometimes referred to as data mining. IT brain 200 mines for data associated with phone number/transaction request 20 that would indicate a tendency for a low or high customer score. Such information may include payment histories for certain on-line vendors, in-service dates for the destination phone number, the type of dwelling that is serviced by the destination telephone number (i.e., whether the dwelling is a home or an apartment), accurate BNA information, and the like. IT brain 200 will preferably mine data in external databases 21-1 through 21-N and possibly find correlation elements 22 to correlate the data mined with the destination of phone number preferably within a period of time after the initial collect call being made.

After completion of the data mining process and evaluating all of correlation elements 22, iT brain 200 preferably recalculates a predictive risk management value and refines customer score 202 to phone number/transaction request 20. As opposed to the real-time determination represented by initial customer score 202, refined customer score 202 preferably represents a more accurate investigation and prediction into the customer score or predictive risk of the called party at phone number/transaction request 20. The eventual level of customer score 202 may preferably indicate to iCSS 100 that future calls should either be blocked or be turned over to iROM 101 for determination of a revenue opportunity product to be offered to the called party When a revenue opportunity product may be desirable, iCSS 100 preferably communicates customer score 202 to iROM 101 for determining appropriate revenue or profit opportunity products or applications to offer or select for the called party. iROM 101 examines customer score 202 and compares it to the ORM to select various payment and billing products according to cycle list 207 and product list 208. The service provider would either present the list of possible products to the customer for selection, or select the most desirable product automatically. For example, if phone number/transaction request 20 is serviced by a LEC which does not have a billing arrangement with the prison telecommunication service provider, yet its customer score 202 represents an extremely low risk and high profitability margin, iROM 101 may select to offer standard payment products, which include post-paid products billed directly by the service provider on a monthly payment cycle. These high-valued customers may also preferably warrant additional grace periods in which to make payments after the 30-day cycle. In contrast, if customer score 202 represents a higher risk value than risk threshold 203, but still offers a reasonable predictive risk of recovering revenue, iROM 101 may select to offer different prepaid calling packages to the called party at phone number/transaction request 20, including various denominations and accounts to pay for future or pending collect calls. Additional, if customer score 202 represents a high predictive risk, but still an acceptable level, instead of a prepaid product, a standard post-paid bill product may be offered. However, instead of providing for a 30 day billing cycle as with the lower risk customers, iROM 101 may select more frequent billing cycles, such as billing every three days, with a payment return time of three days. In this manner, the higher risk individuals will be billed more quickly and, if their payments are not received in the time allotted, their accounts may be blocked before further costs are expended completing calls that may not be paid for.

In conjunction with the revenue opportunity products offered by iROM 101, iDBS 102 adds direct billing methods to supplement the revenue opportunity products. For example, if phone number/transaction request 20 has a very low risk level in customer score 202, but, the destination number is served by a LEC which does not have a billing agreement with the prison telecommunication provider, iCBS, as depicted in FIG. 1, would still operate to optimize profits from such potential callers by implementing a direct billing scheme from iDBS 102, which sends bills directly to the called party to pay for collect calls made from the prison. Thus, while the prior art methods would simply block all such calls, the method described in this embodiment of the present invention, operate to optimize profits that would otherwise go unrealized. It should be noted that additional necessity for direct billing may generally arise when iROM 101 designates or selects billing and/or payment cycles of less than the standard 30 day periods. Because typical LECs do not bill in cycles less than 30 days, it would be required that the prison telecommunications provider bill those clients directly for the shortened billing and/or payment cycle. Alternatively, for low risk, high profit margin customers, standard billing through LEC billing 23 could be continued. The ultimate choice of billing products preferably results from a comparison of the cost and economic benefits for the different available products.

Additional embodiments of the present invention may also include iHVC 103 to provide customer services. Even though the specifically described example addresses issues involved in serving prisons, a considerable amount of revenue is still available in providing such telecommunication services to the prison and the prisoners' family communities. Thus, as in any other service oriented business, customer service and customer satisfaction is important in maintaining revenue and also increasing the recovery of revenue and ultimate firm profitability. With these goals in mind, iCBS 10, as depicted in FIG. 1, provides a system for offering variable levels of service to customers depending on the value of customer score 202. For example, average customers who pay a small amount on low margin accounts may be placed into a queue for an interactive voice response (IVR) system in order to access help applications or caller customer services. In contrast, highly valued customers with customer score 202 that represent very low predictive risk and very high profit margin, may be treated differently in the service center interactions. These higher valued customers may, for instance, be placed at the beginning of the queue to the IVR system. Alternatively, the higher valued customers may have a separate customer service access number to call that offers fewer and shorter waiting periods and possibly even more customer service opportunities. Even further, the highest valued customers may be directly connected to live operators in order to access the customer service system. In creating the different service levels in service level list 206, iCBS 10 (FIG. 1) operates to preserve and extend the possible revenue recovery from the highest valued customers, while at the same time providing incentive for the lower valued (i.e., higher predictive risk and lower profit margin) customers to increase their customer or profitability score to obtain higher levels of service.

Figure 3:
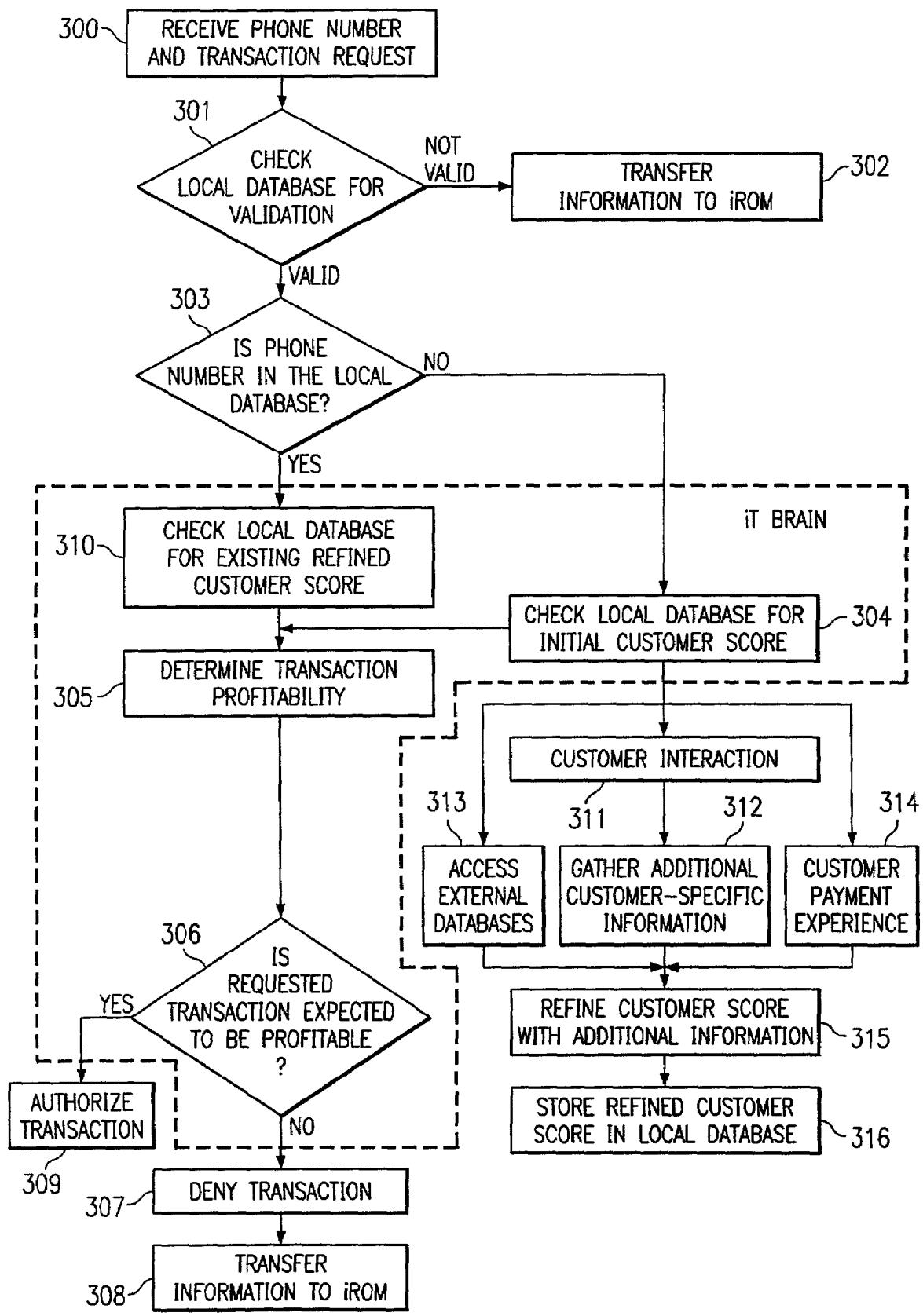
FIG. 3 is a flowchart illustrating steps that may be used to implement the intelligent customer scoring system used in the embodiment of the present invention shown in FIGS. 1 and 2.

FIG. 3 is a flow chart that illustrates the steps implemented in carrying out the function of the iCSS of the revenue optimizing system of the described embodiment of the present invention shown in FIGS. 1 and 2. In step 300, the iCSS receives a phone number and transaction request. The transaction request and/or related phone number may be an initial transaction request or may be a repeat transaction request. In step 301, the system checks the local database for validation (validation may comprise the verification that a billing mechanism is in place to bill the requested transaction). If the phone number cannot be validated, the information is forwarded to the iROM in step 302. In step 303, the local database is again checked for the telephone number. If the record of the phone number is not found in the local database, the system preferably checks for an initial customer score related to the telephone number in step 304. In step 305, the profitability of the transaction is determined. In step 306, using both the profitability information and the initial customer score, the system determines whether the requested transaction is expected to be profitable. If so, the transaction is authorized in step 309. If not, the transaction is denied in step 307 and then transferred to the iROM in step 308.

While the initial customer score is a value calculated in real-time to make a real-time determination to authorize or deny a requested transaction, the refined customer score is a more detailed prediction of risk or dependability level as performed over a longer amount of time and is also a more detailed review of information associated with the phone number. When an initial transaction request has been made, as the iCSS makes its real-time customer assessment, it also begins the process of predicting and determining the refined customer score for subsequent transaction requests. If the phone number is found in the local database in step 303, the database is checked for the existing refined customer score in step 310. The profitability of the transaction is determined in step 305, whereafter a determination is made in step 306 whether the requested transaction is expected to be profitable, based at least in part on the profitability information and the refined customer score. If it is expected to be profitable, the transaction is authorized in step 309. If not, the transaction is denied in step 307 and the information is transferred to the iROM in step 308.

If an initial customer score was calculated as a result of step 304, the system preferably accesses external databases in step 313, checks any customer payment experience in step 314, and gathers additional customer-specific information in step 312, after interacting with the customer in step 311. For example, during any outbound calls placed by the system's IVR units to the called party, the IVR applications prompt the called party for additional, useful identification and validation information. Alternatively, the information may be retrieved when the called party calls the service provide either with live, voice-to-voice or chat capabilities. Using this additional information, the initial customer score is preferably refined into the refined customer score in step 315. Refinement is a continuous process as new information is obtained. Thereafter, the refined customer score is stored in the local database for future use in step 316. As shown in FIG. 3, the iT brain essentially performs the functions described in steps 304-306, and 310.

Figure 4:
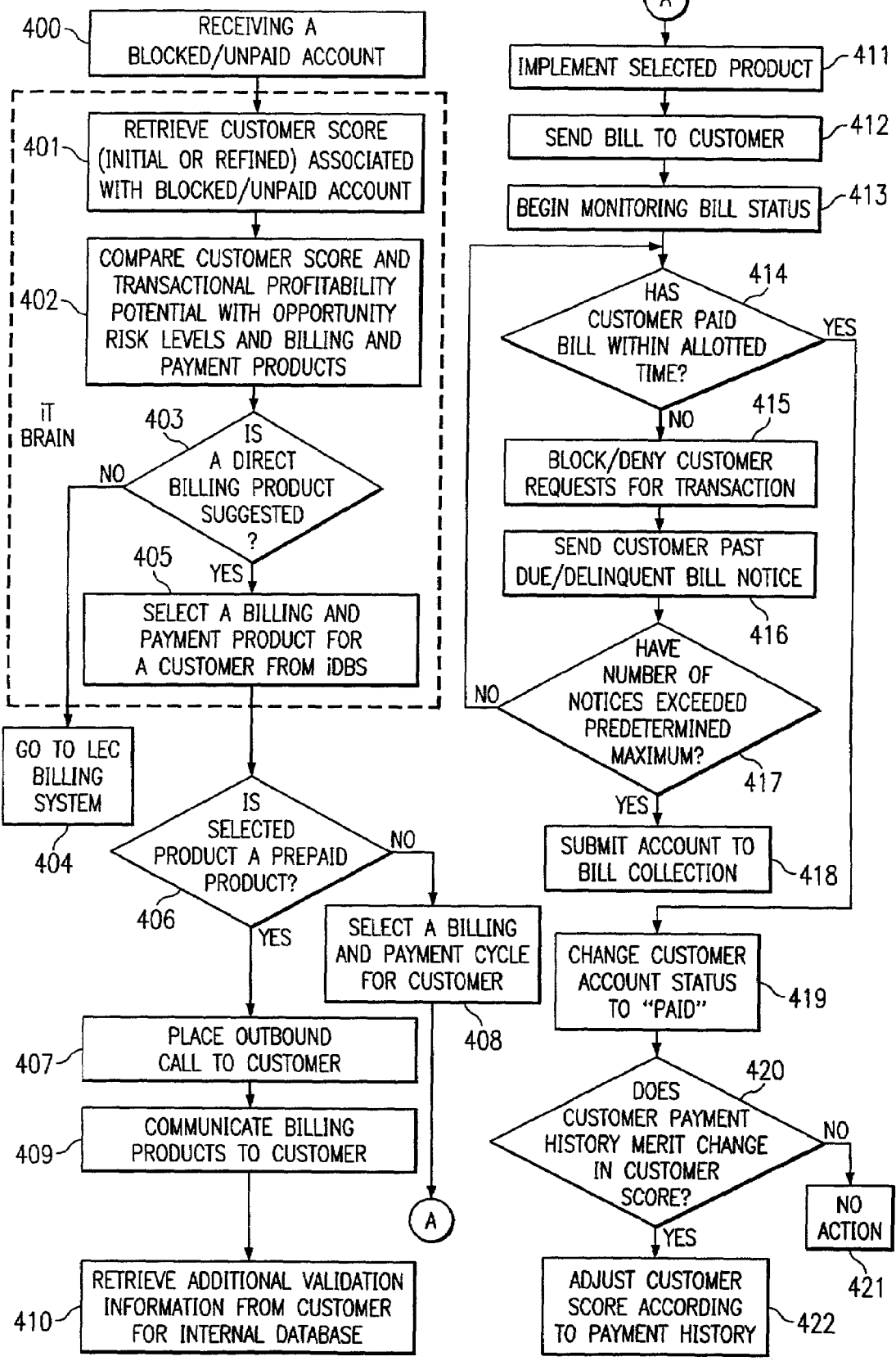
FIG. 4 is a flow chart that represents the steps of functional interaction between the IROM and the iDBS, as shown in FIGS. 1 and 2.

FIG. 4 is a flow chart that represents the steps of functional interaction between the iROM and the iDBS, as shown in FIGS. 1 and 2. The iROM is preferably accessed in response to the delivery of a particular customer score corresponding to a called telephone number or one or more different blocked calls in order to determine whether a revenue opportunity exists in providing one or more of the revenue opportunity products. In step 400, the iROM receives a blocked or unpaid account along with the telephone number associated with that account. Upon receipt of that blocked account, the iROM retrieves the customer score (either initial or refined) associated with that account in step 401. The iROM is generally implemented when blocked accounts are received; whether those blocked accounts are due to a bad debt or due to the destination numbers being serviced by a LEC without a billing arrangement with the prison communication provider. In step 402, the iROM preferably compares the customer number and the transaction profitability with the ORM to identify possible applicable revenue or profit generation applications and billing and payment products.

The iROM determines whether a direct billing product would be available or beneficial to the customer in step 403 based on its cost and economic benefits. If no direct billing product is suggested, then, in step 404, the iROM will pass the billing structure over to a standard third-party-billing-authority option, such as the LEC billing in the prison service provider example. If, on the other hand, it is determined that an appropriate direct billing product may be available from the iDBS, the iROM will identify and/or select a particular product or a set of possible products for a customer in step 405. In step 406, a determination is made whether the selected product or products are pre-paid products or post-paid products. If one or more of the selected products is a pre-paid product, the product is grouped for presentation to the customer in steps 407 and 408. If, however, the selected product includes a post-paid product, the iDBS, responsive to the customer score comparison, will select the appropriate variable billing cycle and/or variable payment cycle for the customer in step 408. The identified post-paid products may also be assembled with any of the identified prepaid products for presentation to the customer in steps 407 and 408. However, the in the described embodiment, the system will preferably automatically select the specific direct billing product that is most beneficial for profit optimization. In step 407, the system places an outbound call to the customer at the telephone number. During the call, the different identified prepaid and/or post-paid products are presented to the customer to select for facilitating future transactions in step 409. Additionally, in step 410, the system retrieves additional validation and/or identification data from the customer to supplement the information contained in the internal/local database. Upon receiving the product selection from the customer, the system will implement the selected product in step 411.

If a post-paid product is selected, the system sends the bill directly to the customer in step 412. Once the bill has been sent to the customer, the system preferably begins to monitor the bill status of the outstanding pending bill in step 413. As a part of the monitoring process, in step 414, the system determines whether the customer has fully paid the bill within the time allotted. If the customer has not fully paid the bill within the allotted time, the system preferably blocks or denies any future or pending requests of the customer in step 415. The iDBS preferably sends the customer a past due or delinquent notice in step 416. Depending on the number of past due or delinquent notices, as determined by step 417, the customer's account may either be submitted to a bill collection service in step 418, or passed back to the decision block of step 414 to determine whether the customer has paid the bill. As soon as the customer is detected to have paid the bill, the status on the customer's account is preferably changed to a "paid" status in step 419.

To maintain an accurate predictive risk management level or customer score, the iT brain may dynamically adjust the profitability or customer score associated with the customer. In step 420, in addition to gathering the additional information from both the internal and external databases, it is determined whether the specific payment history of the customer merits any change in the customer's related customer score. If no change is indicated, no action is taken in step 421. However, if an adjustment is merited according to the payment history, the system preferably recalculates or adjusts (i.e., refines) the customer score according to the customer's specific payment history in step 422. For example, if the customer has numerous delinquent notices, and/or numerous late payment notices, the system may preferably adjust the customer score to reflect a higher predictive risk associated with that customer. Conversely, if the customer has exhibited a good bill payment history over a period of time, the system may preferably adjust the customer score to reflect a lower predictive risk value for that customer. Thus, as the iT brain learns more about the payment characteristics of the customer, the customer's customer score or profitability level will preferably be adjusted accordingly to accurately reflect the level of profitability or predictive risk for the customer.

FIG. 5 is a flow chart that represents steps that may be implemented when executing the functions of the iHVC of the described embodiment of the present invention shown in FIGS. 1 and 2. In step 500, the iHVC will receive a call for assistance from a customer. The call may be placed to a customer call center, or some other IVR system that implements a customer service call center. Once the call has been received, the iHVC retrieves the customer score associated with the particular customer in step 501. In step 502, the customer score will be compared against the matrix of preset service levels. The iHVC will then select a particular level of service for the customer responsive to the compared customer score, in step 503. The resulting service provided to a customer will, therefore, vary according the customer's customer score.

It should be noted that the present invention is not limited to the described embodiment tailored for prison telecommunication service providers. Alternative embodiments of the present invention may be applied to other businesses as well. For example, remaining in the telecommunications industry, the collect call (i.e., 0+, 1-800-COLLECT, 1-800-CALL-ATT, etc.), 10-10-XXX long distance services, and the like may also implement the present invention to improve its capability for optimizing profitability. Outside of the telecommunication industry, credit and billing systems may be based on the present invention keying credit authorization and risk-dependent transactions on telephone numbers with variable billing and service procedures selectively tailored for the individual customer segment. Any system in which a telephone number may be used to designate the ultimately responsible party may implement various embodiments of the present invention.

Additionally, outside of the credit authorization sectors, call centers may be able to implement various embodiments of the present invention for selectively offering customer service to various callers based on the customer score for potential profitability. For instance, if a caller calls into a business call center, the customer score analysis may be performed to determine that the caller is likely a profitable potential customer. As a result of this customer score, the call center may direct the caller to a more personal calling experience to enhance the callers interaction with the call center.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 6 illustrates computer system 600 adapted to use the present invention. Central processing unit (CPU) 601 is coupled to system bus 602. The CPU 601 may be any general purpose CPU. However, the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects to storage devices 606, such as one or more of a hard drive, a CD drive, a floppy disk drive, a tape drive, to the computer system. The I/O adapter 605 is also connected to printer 614, which would allow the system to print paper copies of information such as document, photographs, articles, etc. Note that the printer may a printer (e.g. dot matrix, laser, etc.), a fax machine, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and microphone 616, to the computer system 600. User interface card 608 also provides sound output to a user via speaker(s) 615. The display card 609 is driven by CPU 601 to control the display on display device 610.

When operating any one or number of embodiments of the present invention as shown in FIGS. 1 & 2, and, in particular, the prison telecommunication service provider embodiment described herein, computer system 600 preferably connects via network 612 to phone system 617, which is connected at some interface point to public switched telephone network (PSTN) 618. Computer system 600 preferably includes software applications, private branch exchange (PBX) 621 and prison phone system application 622, run from CPU 601 to control all aspects of the present invention. As inmates attempt to call from phone 619 to destination number/phone 620, the embodiment of the present invention running on computer system 600 facilitates the connection and the probabilities that the service provider will recover the cost and revenue related to that call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for evaluating profitability and revenue recovery for telephone call connections in a telecommunication system, said method comprising the steps of:

receiving a called telephone number associated with a request to make a collect telephone call from the telecommunication system;

retrieving customer information from a local database in real-time, the customer information related to said called telephone number;

projecting a profit margin, using a processor in real-time, for making the collect telephone call, the profit margin associated with a cost of providing a call connection to the called telephone number using the telecommunications system;

calculating a customer score using the processor, the customer score based upon:
said customer information; and
said profit margin;

wherein real-time approval of said collect telephone call request is a function of at least said customer score;

accessing additional information from an external database related to:
said called telephone number;

refining said customer score using the processor, the refined customer score based on said additional information;

wherein approval of one or more subsequent collect telephone call requests associated with said called telephone number is a function of at least said refined customer score; and selectively identifying at least one alternative billing option for calls to the called telephone number when said collect telephone call request is not approved.

2. The method of claim 1 wherein said additional information comprises at least one of:
an in-service date of said called telephone number;
a dwelling type associated with said called telephone number billing name and address (BNA) information;
customer payment history;
additional validation data obtained directly from a customer during interaction with said customer; and
rate of consumption of said transaction.

3. The method of claim 2 wherein said projecting a profit margin step includes evaluation of one or more of:
contractual obligations;
commission agreements;
type of transaction requested;
governmental regulations;
costs for external validation;
billable rates for services;
billing and collection (B&C) costs; and
arrangements with third party providers.

4. The method of claim 1 wherein said customer information includes at least one of:
said customer score;
customer account limit;
current customer obligation;
customer payment history; and
customer demographic information.

5. The method of claim 4 wherein said customer demographic information is stored according to an area code and prefix of said telephone number.

6. The method of claim 1 further comprising the step of:
storing one or more of:
said customer score;
said customer information;
said profit margin; and
said additional information;
into said local database according to said related called telephone number.

7. The method of claim 1 wherein accessing additional information step includes the step of:
accessing at least one of:
said local database; and
an additional external database.

8. The method of claim 1 wherein said approval of said collect telephone call request comprises the steps of:
comparing said customer score with a predetermined risk threshold;
denying approval of said collect telephone call request when said customer score is a higher risk than said predetermined risk threshold; and
approving said collect telephone call request when said customer score is a lower risk than said predetermined risk threshold.

9. The method of claim 1 wherein said selectively identifying step includes the steps of:
comparing said customer score with a predefined risk matrix, wherein said risk matrix relates to a plurality of alternative billing options;
designating ones of said plurality of alternative billing options corresponding to results of said comparing step; and
executing at least one of said designated ones of said plurality of alternative billing options.

10. The method of claim 9 wherein said selectively identifying step further includes the steps of:
presenting for selection said designated ones of said plurality of alternative billing options to a party associated with the called telephone number.

11. The method of claim 1 further comprising the step of:
selectively setting a usage limit associated with said called telephone number according to said customer score.

12. The method of claim 11 further comprising the steps of:
monitoring a value of transactions associated with said called telephone number;
presenting options for increasing said usage limit; and
denying authorization for any of said transaction request when said value exceeds said credit limit.

13. The method of claim 12 further comprising the step of:
setting a consumption rate limit associated with said called telephone number.

14. The method of claim 13 further comprising the steps of:
monitoring a rate of consumption associated with said called telephone number; and
denying authorization of any of said collect telephone call request when said rate of consumption exceeds said consumption rate limit.

15. The method of claim 1 wherein said real-time approval comprises the steps of:
comparing said customer score with an initial risk threshold;
denying said real-time approval when said customer score is a higher risk than said initial risk threshold; and
approving said real-time approval when said customer score is a lower risk that said initial risk threshold.

16. The method of claim 1 further comprising the steps of:
categorizing said customer score into service level segments;
receiving a service call from said customer associated with said called telephone number;
retrieving said customer score related to said called telephone number; and
providing service to said customer according to one of said service level segments corresponding to said customer score.

17. The method of claim 1 wherein said at least one alternative billing option comprises at least one of:
a post-paid billing product;
a prepaid billing product; and
a third-party-billing-authority product.

18. The method of claim 17 further comprising the step of:
determining which of said at least one alternative billing option to be billed directly by said businesses.

19. The method of claim 18 further comprising the step of: selecting at least one of:
a variable billing cycle; and
a variable payment cycle;
for a selected alternative billing option.

20. A method for optimizing transaction profitability in a telecommunication system, comprising the steps of:
receiving a called telephone number for a collect call connection in the telecommunications system;
validating billing data related to said called telephone number before allowing the call connection;
calculating an expected profitability for said call connection in the telecommunications system before allowing the call connection;
searching in a local database for a customer score related to said called telephone number before allowing the call connection;
comparing said customer score and said expected profitability to a preset threshold, wherein said collect call connection is allowed when said customer score satisfies said preset threshold, and wherein said collect call connection is denied when said refined customer score fails to satisfy said preset threshold;
retrieving initial information before allowing the call connection from a local database related to said called telephone number when said searching step fails;
determining an initial customer score based on:
said expected profitability; and
said initial information;
comparing said initial customer score to said preset threshold, wherein said collect call connection is allowed when said initial customer score satisfies said preset threshold, and wherein said collect call connection is denied when said initial customer score fails to satisfy said preset threshold;
accessing datastores for additional information related to one of said collect call connection and said telephone number;
refining said initial customer score using said additional information;
selectively identifying at least one alternative billing option for one or more of:
said collect call connection failing said validating step;
said collect call connection receiving unfavorable results from said calculating step;
said collect call connection denied when said refined customer score fails to satisfy said preset threshold; and
said collect call connection denied when said initial customer score fails to satisfy said preset threshold;
wherein said at least one alternative billing option includes one or more of:
direct billed products;
third-party billing authority billed products; and
prepaid products;
wherein said direct billed products are selectable based on one or more of:
a selectable billing cycle; and
a selectable payment cycle;
communicating with a customer associated with the called telephone number to provide said at least one at least one alternative billing option includes for selection;
obtaining supplemental information from said customer during said communicating step, wherein said supplemental information is used to further refine said customer score;
wherein said refined customer score is stored onto said local database.

21. A transaction authorization engine for optimizing telecommunication transaction profitability, said transaction authorization engine comprising:
an authorization interface for receiving one or more requests for a collect telephone call to a called phone number;
a customer scoring module for assessing a profitability score associated with
said called phone number; and
said one or more requests for a collect telephone call, wherein said customer scoring module comprises:
one or more internal databases;
a network interface facilitating communication with one or more external databases;
a data manager configured to search said one or more internal databases in real-time for initial data related to said called phone number, wherein said data manager searches said internal databases and said one or more external databases for additional information associated with at least one of said called phone number and said one or more requests for a collect telephone call; and
a profitability manager configured to project a profit margin of said one or more requests for a collect telephone call and calculate said profitability score using said initial data and said profit margin, wherein said profitability score is refined using said additional information;
wherein said authorization interface is configured to authorize said one or more requests for a collect telephone call based on said profitability score; and
a profit opportunity module for selecting ones of a plurality of profit generation applications responsive to said profitability score.

22. The transaction authorization engine of claim 21 wherein said one or more requests for a collect telephone call comprise one of:
an initial request; and
a repeat request.

23. The transaction authorization engine of claim 21 wherein said credit scoring module further comprises:
a revenue evaluation unit for comparing said profitability score with a pre-existing threshold, wherein said revenue evaluation unit determines authorization of said one or more requests for a collect telephone call according to said comparison; and
a process interface for providing access to said profitability score.

24. The transaction authorization engine of claim 21 wherein said one or more internal databases include one or more of:
customer account information;
a profitability score associated with said initial request;
a profitability score associated with said repeat request;
demographic data; and
characteristics of said one or more requests for a collect telephone call.

25. The transaction authorization engine of claim 24 wherein said customer account information comprises one or more of:
said profitability score;
a customer credit limit;
a customer entitlement limit;
customer account balance;
customer payment history;
customer demographic information;
customer transaction profitability margin; and
customer service level.

26. The transaction authorization engine of claim 21 wherein said profit opportunity module includes:
an application matrix indexing said plurality of alternative billing methods according to a graduated range of profit estimates;
a search engine for identifying said ones of a plurality of alternative billing methods corresponding to said profitability score; and
an implementation module for executing at least one of said identified ones of said plurality of alternative billing methods.

27. The transaction authorization engine of claim 26 wherein said profit opportunity module includes:
a customer interface for requesting a customer to select at least one of said identified ones of said plurality of alternative billing methods for execution.

28. The transaction authorization engine of claim 21 wherein each one of said plurality of alternative billing methods comprises one of:
prepaid billing;
postpaid billing; and
third-party billing.

29. The transaction authorization engine of claim 28 wherein said alternative billing methods further includes:
a bill cycle selector for selecting a length of a billing cycle related to said alternative billing methods, wherein said length is selected according to said profitability score; and
a payment cycle selector for selecting a length of a payment cycle related to said alternative billing methods, wherein said length is selected according to said profitability score.

30. The transaction authorization engine of claim 21 further comprising:
a customer call center for providing access to a plurality of customer service levels; and
a customer evaluation unit for determining ones of said plurality of customer service levels to provide a customer responsive to said profitability score of said customer.

31. The transaction authorization engine of claim 29 wherein said alternative billing methods further includes:
a product comparator for comparing the cost and economic benefit of each of said plurality of alternative billing methods.

32. A computer program product having a computer readable medium with computer program logic recorded thereon for maximizing profit generation, said computer program product comprising:
code for receiving a called phone number associated with a collect call request initiated from within a controlled environment facility;
code for locally retrieving customer reliability information in real-time related to said collect call request from a first datastore;
code for forecasting a profit related to said collect call request in real-time;
code for searching one or more datastores for additional information related to one or more of:
said phone number; and
said collect call request;
code for calculating a customer score associated with said phone number using a function of:
said risk information; and
said profit forecast;
code for refining said customer score based on a function of one or more of:
said risk information;
said profit forecast; and
said additional information;
code for selecting at least one of a plurality of billing options responsive at least in part to said customer score.

33. The computer program product of claim 32 wherein said collect call request comprises a preliminary call request, said computer program product further comprising:
code for authorizing said collect call request in real-time as a function of said customer score.

34. The computer program product of claim 33 wherein said customer reliability information comprises a data structure including at least one of:
a customer credit limit;
a customer entitlement limit;
customer account balance;
customer payment history;
customer demographic information; and
said forecasted profit related to said collect call request.

35. The computer program product of claim 34 further comprising code for determining an authorization related to said collect call request.

36. The computer program product of claim 35 wherein said code for determining includes
code for comparing said customer score with a preset threshold;
code for setting said authorization to a denial of a requested call when said preset threshold is exceeded; and
code for setting said authorization to an approval of the requested call when said preset threshold is not exceeded.

37. The computer program product of claim 36 further comprising:
code for communicating to said code for selecting, one of said customer score corresponding to said collect call request when said authorization relating to said collect call transaction request is set to said denial of the requested call.

38. The computer program product of claim 36 wherein said code for determining further includes:
code for comparing said customer account balance with one of said customer credit limit and said customer entitlement limit; and
code for reviewing a status of said customer payment history;
wherein said code for determining is responsive to results from:
said code for comparing said customer account balance; and
said code for reviewing said status.

39. The computer program product of claim 34 wherein said code for selecting includes:
code for indexing said plurality of billing options into an application matrix according to a reliability level associated with each one of said plurality of billing options;

code for searching said application matrix for a subset of said plurality of billing options corresponding to said customer score;

code for executing at least one of said ones of said plurality of billing options corresponding to said one of said RAS and said RTR.

40. The computer program product of claim 39 wherein said code for selecting further comprises:

code for receiving a customer selection of at least one of said subset.

41. The computer program product of claim 32 further comprising:

code for interfacing a customer to a service center, wherein said service center comprises at least one of:

an interactive voice response unit (IVR); and a live operator call center; and wherein said service center provides customer support related to said collect call request.

42. The computer program product of claim 41 wherein said customer support comprises a plurality of service levels.

43. The computer program product of claim 42 further comprising:

code for segregating said customer into one or more service groups according to said customer score associated with said collect call request, wherein said one or more service groups are entitled to receive levels of said plurality of service levels corresponding to said customer score.

* * * * *